US012764480B2

(12) United States Patent
Knudsen et al.

(10) Patent No.: US 12,764,480 B2
(45) Date of Patent: Oct. 13, 2026

(54) HEARING DEVICE AND BATTERY UNIT FOR A HEARING DEVICE

(71) Applicant: GN Hearing A/S, Ballerup (DK)

(72) Inventors: Nils Kristian Knudsen, Roskilde (DK); Anders Hjermø Michaelsen, Bagsværd (DK); Henrik Nielsen, Roskilde (DK)

(73) Assignee: GN HEARING A/S, Ballerup (DK)

( * ) Notice: Subject to any disclaimer, the term of this patent is extended or adjusted under 35 U.S.C. 154(b) by 121 days.

(21) Appl. No.: 18/766,139

(22) Filed: Jul. 8, 2024

(65) Prior Publication Data

US 2025/0024213 A1 Jan. 16, 2025

(30) Foreign Application Priority Data

Jul. 14, 2023 (EP) .................................... 23185700

(51) Int. Cl.

| | |
|---|---|
| ***H04R 25/00*** | (2006.01) |
| ***H01M 50/202*** | (2021.01) |
| ***H01M 50/247*** | (2021.01) |
| ***H01M 50/271*** | (2021.01) |
| ***H01M 50/284*** | (2021.01) |
| ***H01M 50/291*** | (2021.01) |

(52) U.S. Cl.

CPC ........ *H04R 25/602* (2013.01); *H01M 50/202* (2021.01); *H01M 50/247* (2021.01); *H01M 50/271* (2021.01); *H01M 50/284* (2021.01); *H01M 50/291* (2021.01); *H04R 25/609* (2019.05); *H04R 25/65* (2013.01); *H01M 2220/30* (2013.01); *H04R 2225/31* (2013.01)

(58) Field of Classification Search

CPC .... H04R 25/602; H04R 25/609; H04R 25/65; H04R 2225/31

USPC .......................................................... 381/323

See application file for complete search history.

(56) References Cited

U.S. PATENT DOCUMENTS 6,546,108 B1 * 4/2003 Shennib ............... H04R 25/602 381/322
6,731,770 B1 * 5/2004 Vonlanthen .......... H04R 25/556 381/314
2007/0104343 A1 * 5/2007 Bengtsson ........... H04R 25/305 381/322
2019/0110141 A1 4/2019 Beyfuss et al.

OTHER PUBLICATIONS

European Search Report for EP Patent Appln. No. 23185700 dated Dec. 8, 2023.

* cited by examiner

*Primary Examiner* — Suhan Ni

(74) *Attorney, Agent, or Firm* — Vista IP Law Group, LLP

(57) ABSTRACT

A hearing device and a battery unit for a hearing device is provided, the battery unit having a main axis and comprising an adapter and a battery at least partly accommodated in a battery cavity formed by the adapter, the adapter comprising a body; a first contact configured to contact a first battery terminal of the hearing device; and electronic circuitry connected to the first contact and comprising a memory connected to the first contact, wherein the battery unit has an outer surface configuration configured to, in a first orientation in a first direction parallel to the main axis, fit in a battery compartment of a hearing device, and configured to, in a second orientation in a second direction opposite the first direction, not fit in the battery compartment of a hearing device.

24 Claims, 7 Drawing Sheets

HEARING DEVICE AND BATTERY UNIT FOR A HEARING DEVICE

RELATED APPLICATION DATA

This application claims priority to, and the benefit of, European Patent Application No. 23185700.4 filed on Jul. 14, 2023, pending. The entire disclosure of the above application is expressly incorporated by reference herein.

FIELD

The present disclosure relates to a hearing device and related methods including a method of operating a hearing device.

BACKGROUND

Developments in the hearing industry requires the ability for independent service providers or end users to exchange a rechargeable battery. This requirement may introduce challenges to the hearing device manufacturers, e.g. due to different battery sizes and configurations which could degrade performance of the hearing device or ultimately destroy the hearing device.

SUMMARY

Accordingly, there is a need for hearing devices and battery solutions facilitating fail-safe and user-friendly exchange of batteries in a hearing device.

A battery unit for a hearing device is disclosed, the battery unit having a main axis and comprising an adapter and a battery at least partly accommodated in a battery cavity formed by the adapter. The adapter comprises a body; a first contact optionally configured to contact a first battery terminal of the hearing device; and electronic circuitry connected to the first contact. The electronic circuitry may comprise a memory connected to the first contact. The battery unit has an outer surface configuration configured to, in a first orientation in a first direction parallel to the main axis, fit in a battery compartment of a hearing device. The outer surface configuration may be configured to, in a second orientation in a second direction opposite the first direction, not fit in the battery compartment of a hearing device.

Further, a hearing device is disclosed, the hearing device comprising a housing forming at least a part of an outer surface of the hearing device; a frame arranged in the housing; and a battery compartment comprising a first battery terminal, a second battery terminal, and a third battery terminal. The first battery terminal, the second battery terminal, and the third battery terminal are configured to, with a battery unit having a first orientation in the battery compartment, contact respective contacts of the battery unit. At least one of the first battery terminal, the second battery terminal, and the third battery terminal may be configured to, with the battery unit having a second orientation in the battery compartment, not contact a contact of the battery unit.

It is an important advantage of the hearing device that a hearing device is able to use batteries with different geometrical and/or electrical properties, thereby reducing the requirements to the batteries, and increasing both lifetime of both hearing device and battery unit. Further, the present disclosure improves galvanic contact between battery terminals and the battery unit in turn providing reliant and fail-safe power supply to the hearing device.

The present disclosure allows for an independent service provider to perform a battery change in such a way that the hearing device is not damaged, e.g. by reducing the risk of misplacement, and avoiding damage to electronic circuitry of the hearing device. Further, the hearing device may be able to accommodate and use batteries from different manufacturers, e.g. using different battery configurations.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
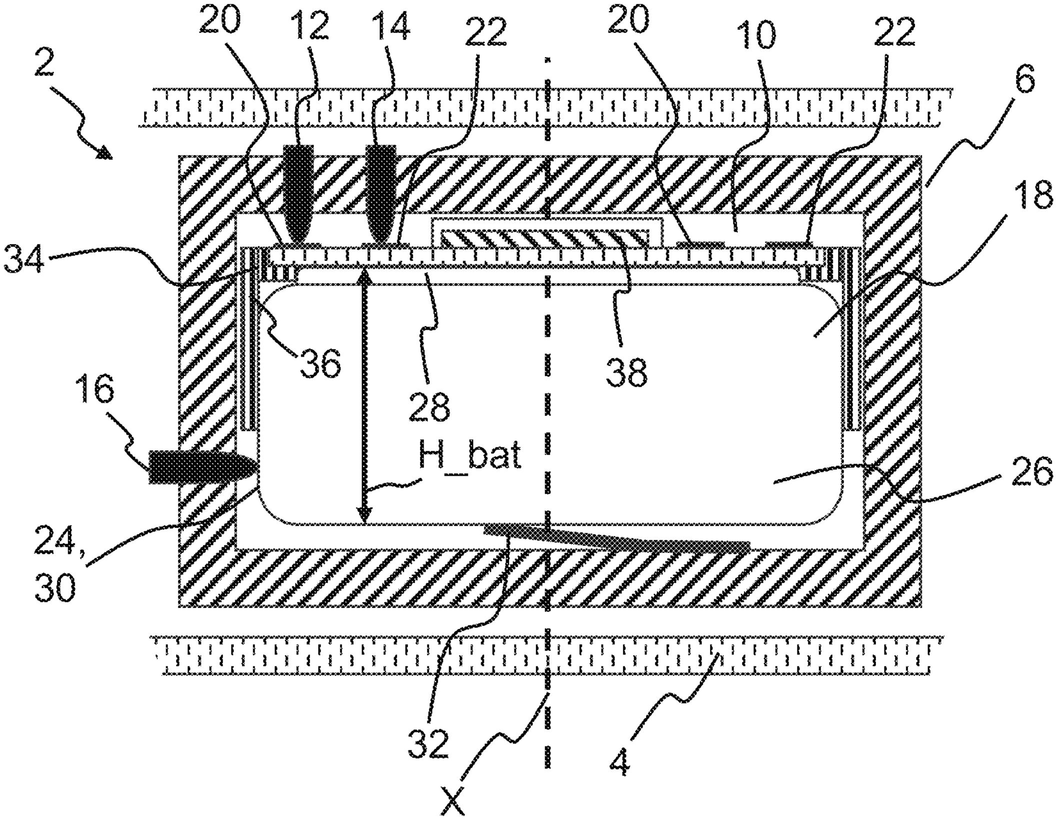
FIG. 1 schematically illustrates a cross section of an example hearing device with a battery unit in a first orientation, FIG. 2 schematically illustrates the hearing device of FIG. 1 with the battery unit in a second orientation, FIG. 3 schematically illustrates a cross section of an exemplary hearing device, FIG. 4 schematically illustrates a cross section of an adapter of a battery unit.

Various exemplary embodiments and details are described hereinafter, with reference to the figures when relevant. It should be noted that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device is disclosed. The hearing device may be configured to be worn at an ear of a user and may be a hearable or a hearing aid, wherein the processor is configured to compensate for a hearing loss of a user.

The hearing device may be of the behind-the-ear (BTE) type, in-the-ear (ITE) type, in-the-canal (ITC) type, receiver-in-canal (RIC) type or receiver-in-the-ear (RITE) type. The hearing aid may be a binaural hearing aid. The hearing device may comprise a first earpiece and a second earpiece, wherein the first earpiece and/or the second earpiece is an earpiece as disclosed herein.

A battery unit for a hearing device is disclosed, the battery unit having a main axis and comprising an adapter and a battery at least partly accommodated in a battery cavity formed by the adapter. The adapter comprises a body; one or more contacts, such as a first contact and optionally a second contact; and electronic circuitry connected to the first contact.

The battery may be a rechargeable battery.

The one or more contacts or connectors are configured to contact respective battery terminals in a battery compartment of the hearing device. The first contact may be configured to, e.g. at least in a first orientation of the battery unit in a battery compartment of the hearing device, to contact a first battery terminal of the hearing device.

The body may be made of non-conductive material, such as a plastic material.

The electronic circuitry may comprise one or more electronic components, such as a memory. The memory may be connected to the first contact and/or the second contact.

The memory may comprise one or more battery identifiers indicative of one or more battery characteristics. The one or more battery identifiers may comprise a battery model identifier indicative of a model or type of the battery. The one or more battery identifiers may comprise a battery size identifier indicative of a size and/or shape of the battery. The one or more battery identifiers may comprise a battery capacity identifier indicative of an electric capacity of the battery. The one or more battery identifiers may comprise a battery voltage identifier indicative of an electric voltage supplied by the battery.

In one or more examples, the battery unit has an outer surface configuration configured to, in a first orientation e.g. in a first direction parallel to the main axis, fit in a battery compartment of a hearing device. The outer surface configuration may be configured to, in a second orientation e.g. in a second direction opposite the first direction, not fit in the battery compartment of a hearing device.

The battery unit/outer surface configuration configured to fit in the battery compartment may include that the first contact, the second contact, and a third contact if present of the battery unit contact respective first battery terminal, second battery terminal, and third battery terminal in the battery compartment.

The battery unit/outer surface configuration configured to not fit in the battery compartment may include that the battery unit has an outer shape that prevents the battery unit from being inserted in the battery compartment. In other words, the outer surface configuration may be configured to, in a second orientation e.g. in a second direction opposite the first direction, prevent the battery unit from being inserted in the battery compartment of a hearing device.

The battery unit/outer surface configuration configured to not fit in the battery compartment may include that one or both of the first contact and the second contact of the battery unit does not contact a battery terminal in the battery compartment of the hearing device. In other words, the outer surface configuration may be configured to, in a second orientation e.g. in a second direction opposite the first direction, prevent that one or both of the first contact and the second contact of the battery unit contact a battery terminal in the battery compartment of the hearing device.

The battery unit/outer surface configuration configured to not fit in the battery compartment may include that one or both of a first electrode of the battery and a second electrode of the battery does not contact a battery terminal in the battery compartment of the hearing device. In other words, the outer surface configuration may be configured to, in a second orientation e.g. in a second direction opposite the first direction, prevent that one or both of a first electrode of the battery and a second electrode of the battery contact a battery terminal in the battery compartment of the hearing device.

In one or more examples, the battery unit has a main axis and comprises an adapter and a battery at least partly accommodated in a battery cavity formed by the adapter, the adapter comprising a body; a first contact configured to contact a first battery terminal of the hearing device; and electronic circuitry connected to the first contact and comprising a memory connected to the first contact, wherein the battery unit has an outer surface configuration configured to, in a first orientation in a first direction parallel to the main axis, fit in a battery compartment of a hearing device, and configured to, in a second orientation in a second direction opposite the first direction, not fit in the battery compartment of a hearing device.

In one or more examples, the adapter, such as the body, has a first sidewall with a first outer side surface and a first diameter. The adapter, such as the body or a cover, may have a second sidewall with a second outer side surface and a second diameter. The second diameter may be less than the first diameter. A first sidewall and a second sidewall may provide a varying diameter along the main axis, which may be used, e.g. together with one or more guide elements of the battery compartment, to secure that the battery unit only fits in the battery compartment in the first orientation.

The first outer surface and/or the second outer surface may be cylindrical, e.g. with a circular cross-section, along the main axis. Thereby, easy insertion of the battery unit may be provided, e.g. by not requiring a specific orientation rotation-wise about the main axis.

The adapter may comprise an intermediate outer surface. The intermediate outer surface may be perpendicular to the main axis and may form at least a part of the transition between the first sidewall and the second side wall. The body may comprise an end wall e.g. forming a part of the intermediate outer surface. The end wall of the body may be perpendicular to the main axis.

In one or more examples, the first sidewall has a first inner surface forming a part of the battery cavity. The first sidewall has a first height. The first height is measured along the main axis of the battery unit. The first height may be less than a height of the battery. In one or more examples, the difference between the first height and the height of the battery is at least 1 mm, such as at least 1.5 mm, e.g. about 2.0 mm. The first sidewall may have one or more openings and/or one or more slits or cut-outs. In other words, the battery may be radially exposed from the main axis, e.g. such that a battery terminal of the battery compartment can contact a sidewall of the battery, the sidewall of the battery optionally forming an electrode, such as negative or positive electrode, of the battery.

In one or more examples, the first contact comprises a metallic ring having a first contact radius. The first contact may comprise one or more arch-shaped segments, e.g. forming a generally ring-shaped contour with the first contact radius The first contact may be arranged on an outer surface of the adapter. In one or more examples, the first contact is arranged on the intermediate outer surface and/or on the first outer side surface.

In one or more examples, the adapter comprises a second contact configured to contact a second battery terminal, such as minus or ground, of the hearing device. The second contact may be electrically connected to a first electrode of the battery, such as a negative electrode of the battery.

In one or more examples, the second contact is connected to the electronic circuitry. The second contact may form a ground connection for the electronic circuitry.

In one or more examples, the second contact comprises a metallic ring having a second contact radius. The second contact may comprise one or more arch-shaped segments, e.g. forming a generally ring-shaped contour with the second contact radius The second contact may be arranged on an outer surface of the adapter. In one or more examples, the second contact is arranged on the intermediate outer surface and/or on the first outer side surface. The first contact and the second contact may be concentric rings, e.g. where the second contact is inside the first contact. Thereby a large distance between the second contact and a third contact is provided for in turn reducing the risk of creep current in the hearing device.

In one or more examples, the second contact radius is smaller than the first contact radius. In other words, the second contact is optionally arranged inside the first contact.

In one or more examples, the adapter comprises a third contact configured to contact a third battery terminal of the hearing device, wherein the third contact is electrically connected to a second electrode of the battery, such as a positive electrode of the battery.

In one or more examples, the third contact comprises a metallic ring having a third contact radius. The third contact may comprise one or more arch-shaped segments, e.g. forming a generally ring-shaped contour with the third contact radius. The third radius may be larger than the first. The third contact may be arranged on an outer surface of the adapter. In one or more examples, the third contact is arranged on the intermediate outer surface and/or on the first outer side surface.

In one or more examples, the adapter comprises a printed circuit board assembly, PCBA, the printed circuit board assembly comprising a printed circuit board, PCB, the electronic circuitry and one or more contacts including the first contact. The printed circuit board may comprise a flex-PCB. In one or more examples, the PCB forms at least a part of the body. The one or more contacts may be arranged on the PCB, such as on an outer surface of the PCB. The PCBA may comprise one or more inner contacts, e.g. including a first inner contact, arranged on an inner surface of the PCB. The first inner contact may be connected to the second contact via conductors in the PCB, and may be connected to the first electrode of the battery, e.g. by soldering, gluing with electrically conductive glue, or by conductive paste.

The PCB comprises an inner surface facing the battery and an outer surface facing the surroundings. The electronic circuitry may be arranged on the outer surface of the PCB.

The printed circuit board assembly may comprise a cover, e.g. covering the electronic circuitry. The cover may be a plastic cover. The cover may be glued to the PCB.

In one or more examples, the cover forms the second sidewall and/or a top wall of the adapter. The cover may form a guide element of the battery unit during insertion in the battery compartment.

The electronic circuitry may be arranged on the inner surface of the PCB. In other words, the electronic circuitry may be arranged between the PCB and the battery.

In one or more examples, the printed circuit board assembly comprises a test pad or a plurality of test pads including a first test pad and a second test pad.

A hearing device is disclosed.

In one or more examples, a hearing device is disclosed, the hearing device comprising a housing forming at least a part of an outer surface of the hearing device; a frame arranged in the housing; and a battery compartment comprising a first battery terminal, a second battery terminal, and a third battery terminal configured to, with a battery unit having a first orientation, contact respective contacts of the battery unit, wherein at least one of the first battery terminal, the second battery terminal, and the third battery terminal is configured to, with a battery unit having a second orientation, not contact a contact of the battery unit.

In one or more examples, the battery compartment comprises a guide element configured to prevent insertion of a battery unit in the second orientation. The guide element optionally comprises a recess in an inner surface of the battery compartment. The guide element may comprise or be formed as one or more protrusions in the battery compartment, such as in one or more of the first wall, the second wall, and the third wall.

In one or more examples, the battery compartment comprises a spring element configured to press a battery unit towards the first battery terminal and/or towards the second battery terminal, e.g. to secure good galvanic contact between battery terminals and respective contacts.

In one or more examples, the hearing device comprises a battery unit as disclosed herein.

The housing of the hearing device may comprise one or more shells or outer parts. The hearing device comprises a frame arranged in the housing. The frame may be configured to carry a printed circuit board, PCB, such as flexible PCB. In other words, the PCB or PCBA of the hearing device may be mounted on the frame. One or more electric components of the hearing device, such as one or more of processor, radio transceiver, power module, and microphone(s) may be mounted on the PCB.

The hearing device comprises a battery compartment. The battery compartment comprises a plurality of, such as three, four, or more battery terminals. The battery compartment comprises a first battery terminal and a second battery terminal. The battery compartment may comprise a third battery terminal and optionally a fourth battery terminal. The battery terminals are configured to, when the battery unit is inserted having a first orientation, electrically connect respective contacts of the battery unit and electrode(s) of the battery to the hearing device PCB/PCBA.

The hearing device may comprise an inner compartment. The battery compartment is optionally separated, such as sealed, from the inner compartment.

The hearing device may be configured for wireless communication with one or more devices, such as with another hearing device, e.g. as part of a binaural hearing system, and/or with one or more accessory devices, such as a smartphone and/or a smart watch. The hearing device optionally comprises an antenna for converting one or more wireless input signals, e.g. a first wireless input signal and/or a second wireless input signal, to antenna output signal(s). The wireless input signal(s) may origin from external source (s), such as spouse microphone device(s), wireless TV audio transmitter, and/or a distributed microphone array associated with a wireless transmitter. The wireless input signal(s) may origin from another hearing device, e.g. as part of a binaural hearing system, and/or from one or more accessory devices.

The hearing device optionally comprises a radio transceiver coupled to the antenna for converting the antenna output signal to a transceiver input signal. Wireless signals from different external sources may be multiplexed in the radio transceiver to a transceiver input signal or provided as separate transceiver input signals on separate transceiver output terminals of the radio transceiver. The hearing device may comprise a plurality of antennas and/or an antenna may be configured to be operate in one or a plurality of antenna modes. The transceiver input signal optionally comprises a first transceiver input signal representative of the first wireless signal from a first external source.

The hearing device comprises a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal.

The hearing device comprises a processor for processing input signals from the microphone(s) and/or the radio transceiver. The processor provides an electrical output signal based on the input signals to the processor. Input terminal(s) of the processor are optionally connected to respective output terminals of the microphone(s) and/or the radio transceiver.

The hearing device comprises a processor for processing input signals, such as transceiver input signal(s) and/or microphone input signal(s). The processor is optionally configured to compensate for hearing loss of a user of the hearing device. The processor provides an electrical output signal based on the input signals to the processor.

The battery terminals of the hearing device are configured to connect the battery/battery unit arranged in the battery compartment to the PCBA of the hearing device, such as power module and other electric components of the hearing device, e.g. via conductors, such as traces of PCB and/or wires, such as litz wires. One or more of the battery terminals may be metallic spring members.

The first battery terminal may be arranged in a wall of the battery compartment, such as the frame and/or the housing. For example, the first battery terminal may extend through a wall of the frame and/or the housing. The first battery terminal may be configured to contact a first contact or first connector element of the battery unit, when the battery unit fits, e.g. is inserted having a first orientation, in the battery compartment.

The second battery terminal may be arranged in a wall of the battery compartment, such as the frame and/or the housing. For example, the second battery terminal may extend through a wall of the frame and/or the housing. The second battery terminal may be configured to contact a second contact or second connector element of the battery unit, when the battery unit fits, e.g. is inserted having a first orientation, in the battery compartment.

The battery compartment may comprise a third battery terminal. The third battery terminal may be arranged in a wall of the battery compartment, such as the frame and/or the housing. For example, the third battery terminal may extend through a wall of the frame and/or the housing. The third battery terminal may be configured to contact an electrode of the battery, when the battery unit fits, e.g. is inserted having a first orientation, in the battery compartment. The third battery terminal may be configured to contact a third contact or third connector element of the battery unit, when the battery unit fits, e.g. is inserted having a first orientation, in the battery compartment.

In one or more examples, the battery compartment comprises a first wall, a second wall, and a third wall, the third wall connecting the first wall and the second wall. The first wall and the second wall may be plane walls. The first wall and the second wall may be parallel or extend in parallel planes. The spring element configured to press a battery unit towards the first battery terminal and/or towards the second battery terminal may be arranged on the second wall of the battery compartment.

The battery compartment may be formed by at least a part of the frame and/or formed by at least a part of the housing. The frame may form the first wall or at least a part thereof. The frame may form the second wall or at least a part thereof. The frame may form the third wall or at least a part thereof. The housing may form the first wall or at least a part thereof. The housing may form the second wall or at least a part thereof. The housing may form the third wall or at least a part thereof. In one or more examples, the housing forms at least a part of the first wall and/or the second wall, and the frame forms at least a part of the third wall.

The first battery terminal is optionally arranged on the first wall and may be configured to contact a first contact on an outer surface of the battery unit. The top wall/surface and the intermediate surface of the battery unit optionally faces the first wall of the battery compartment, when the battery unit is correctly inserted in the battery compartment, i.e. having a first orientation, in the battery compartment. The first battery terminal may be arranged on the third wall and may be configured to contact the first contact arranged on the first outer side surface of the battery unit.

In one or more examples, the second battery terminal is arranged on the first wall, the second wall or the third wall. The second battery terminal may be arranged on the same wall as the first battery terminal. The second battery terminal may be configured to contact a second contact on an outer surface of the battery unit or to contact an electrode on the bottom surface of the battery.

In one or more examples, the hearing device comprises a power module configured to charge the rechargeable battery. The power module is connected to the battery unit via one or more of the battery terminals, such as the first battery terminal and the third battery terminal.

In one or more examples, the hearing device has a battery opening in the outer surface, and the hearing device comprising a battery lid configured to close the battery opening. The battery lid may also be referred to as a battery door.

FIG. 1 shows a schematic cross section of a part of an exemplary hearing device with a battery unit arranged with a first orientation in a battery compartment. The hearing device 2 comprises a housing 4 forming at least a part of an outer surface of the hearing device 2; a frame 6 arranged in the housing 4; and a battery compartment 10 comprising a first battery terminal 12, a second battery terminal 14, and a third battery terminal 16. The first battery terminal 12 is configured to, with the battery unit 18 having a first orientation in the battery compartment as shown in FIG. 1, contact a first contact 20 of the battery unit 18. The second battery terminal 14 is configured to contact second contact 22 of the battery unit 18, and the third battery terminal 16 is configured to contact third contact 24 of the battery unit 18. The battery unit 18 comprises a battery 26 having a first electrode 28 (minus) connected to the second electrode 14. The battery 26 has a second electrode 30 (plus) forming the third contact 24 of the battery unit 18.

The battery compartment 10 comprises a spring element 32 configured to press the battery unit 18 towards the first battery terminal 12 and the second battery terminal 14, e.g. to secure good galvanic contact between battery terminals 12, 14 and respective contacts 20, 22.

The battery unit 18 has a main axis X and comprises an adapter 34 and the battery 26 at least partly accommodated in a battery cavity formed by the adapter 34. The adapter 34 comprises a body 36; a first contact 20 configured to contact a first battery terminal 12 of the hearing device 2; and electronic circuitry 38 connected to the first contact 20 and comprising a memory (not shown) connected to the first contact 20. The battery unit has an outer surface configuration configured to, in a first orientation in a first direction parallel to the main axis X as shown in FIG. 1, fit in the battery compartment 10 of a hearing device, i.e. the contacts 20, 22, 24 of the battery unit 18 contact and form galvanic connection to respective battery terminals 12, 14, 16 of the battery compartment 10.

Figure 2:
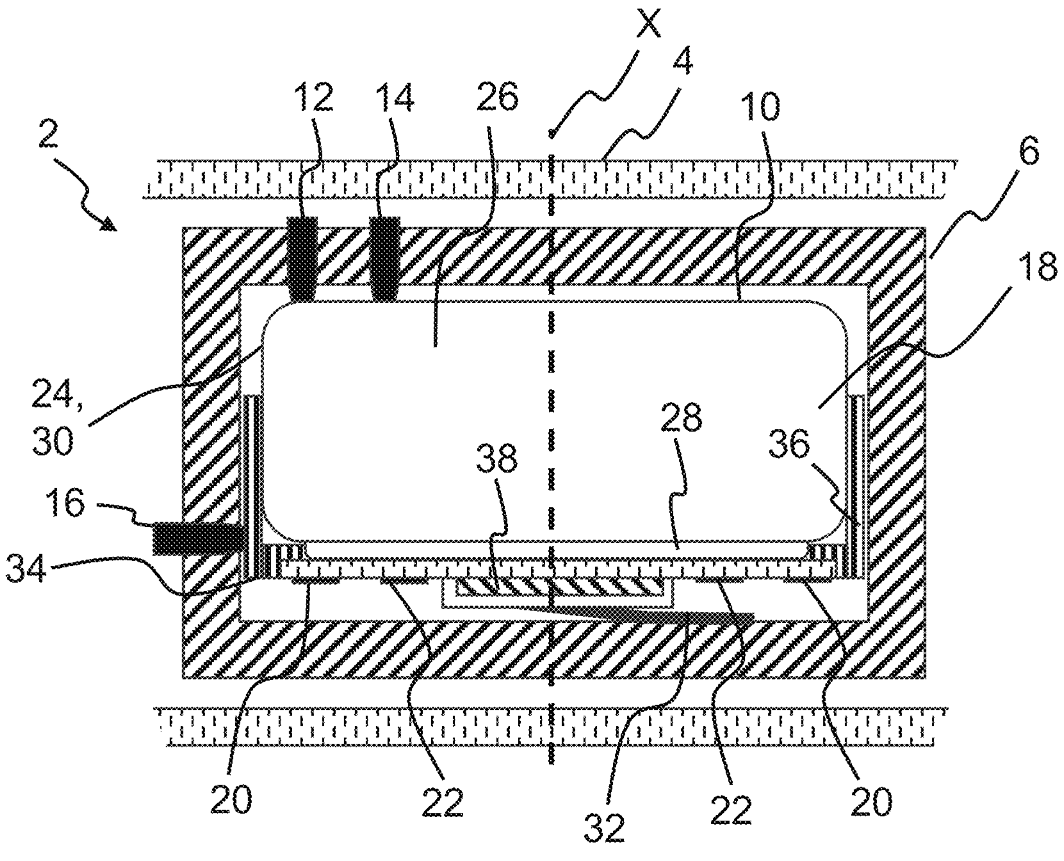

FIG. 2 shows the battery unit 18 in a second orientation in a second direction opposite the first direction shown in FIG. 2, where the battery unit 18 does not fit in the battery compartment 10 of the hearing device 2, since the battery terminals 12, 14, 16 do not contact respective contact 20, 22, 24. Thus, the third battery terminal 16 is configured to, with the battery unit having a second orientation in the battery compartment as shown in FIG. 2, not contact a contact of the battery unit.

Further, the outer surface configuration of the battery unit 18 is configured to, in the second orientation as shown in FIG. 2, prevent that one or both of the first contact 20 and the second contact 22 of the battery unit 18 contact a battery terminal in the battery compartment 10 of the hearing device 2.

Figure 3:
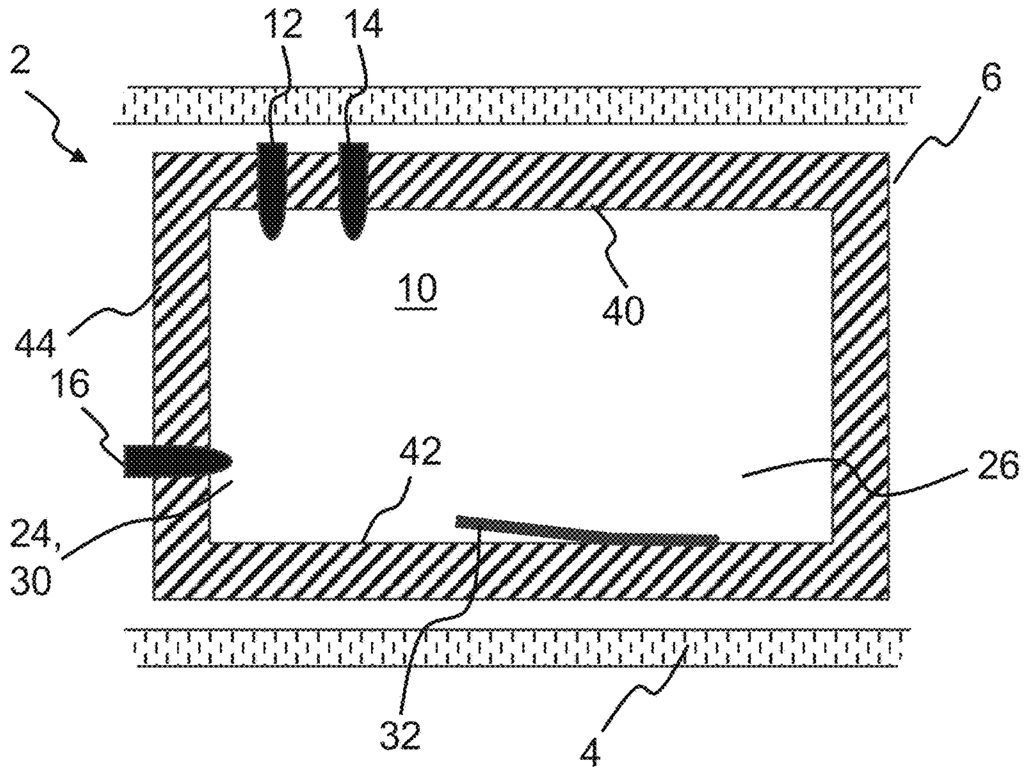

FIG. 3 shows the hearing device 2 without the battery unit 18. The battery compartment 10 comprises or is defined by a first wall 40, a second wall 42, and a third wall 24, the third wall 24 connecting the first wall 20 and the second wall 24. In the hearing device 2, the frame 6 forms the walls 20, 22, 24.

The first battery terminal 12 and the second battery terminal are arranged on the first wall 40. The third battery terminal 16 is arranged on the third wall 44. Depending on the battery unit design, the third battery terminal 16 may be arranged on the first wall 40. In one or more examples the battery terminals are arranged on the same wall, such as the first wall 40 or the third wall 44

Figure 4:
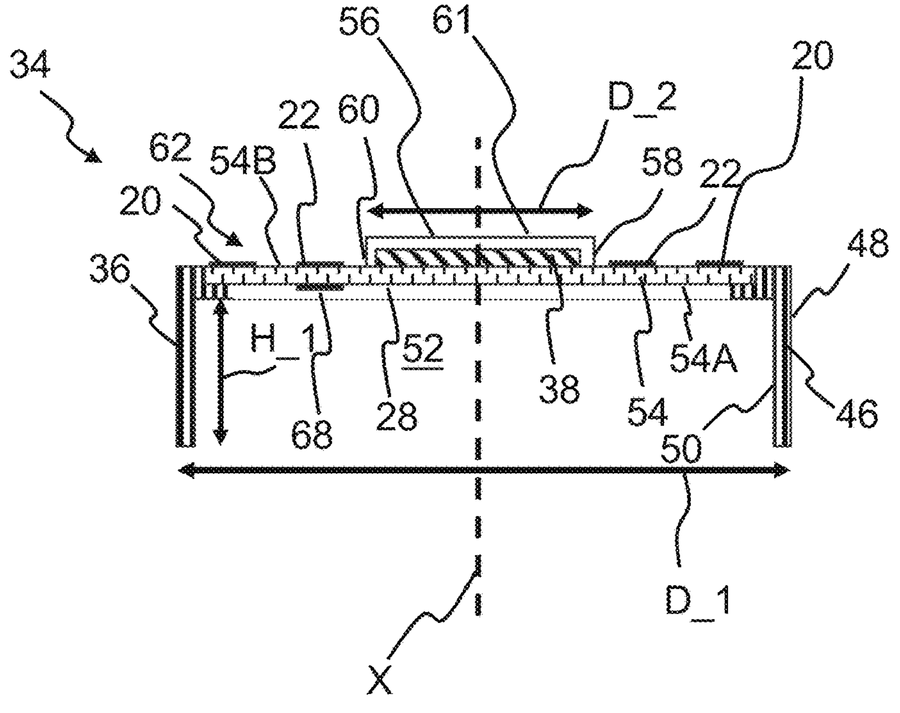

FIG. 4 shows a cross-section of an example adapter 34 of a battery unit, such as battery unit 18. The adapter 34/the body 36 has a first sidewall 46 formed as a hollow cylinder with a first outer side surface 48 and a first diameter D_1, the first sidewall 46 having a first inner surface 50 forming a part of the battery cavity 52, and the first sidewall 46 having a first height H_1 less than a height H_bat of the battery, see FIG. 1. Further, the adapter 34 comprises a printed circuit board 54, PCB, and a cover 56 covering the electronic circuitry. The cover 56 forms a second sidewall 58 with a second outer side surface 60 being a cylindrical surface and having a second diameter D_2 less than the first diameter D_1. Further, the cover 56 forms a top wall 61 of the adapter 34.

In FIG. 4, the electronic circuitry 38 and cover 56 is arranged on the outer surface 54B of PCB, however it is to be understood that the electronic circuitry 38 and/or cover 56 may be arranged on the inner surface 54A of PCB 54.

In one or more examples of the adapter, D_1 is in the range from 5.0 mm to 13 mm. In one or more examples of the adapter, D_2 may be in the range from 2 mm to 8 mm. The contacts 20, 22 are arranged on an intermediate outer surface 62 of the adapter 34, the intermediate outer surface 62 perpendicular to the main axis X.

Figure 5:
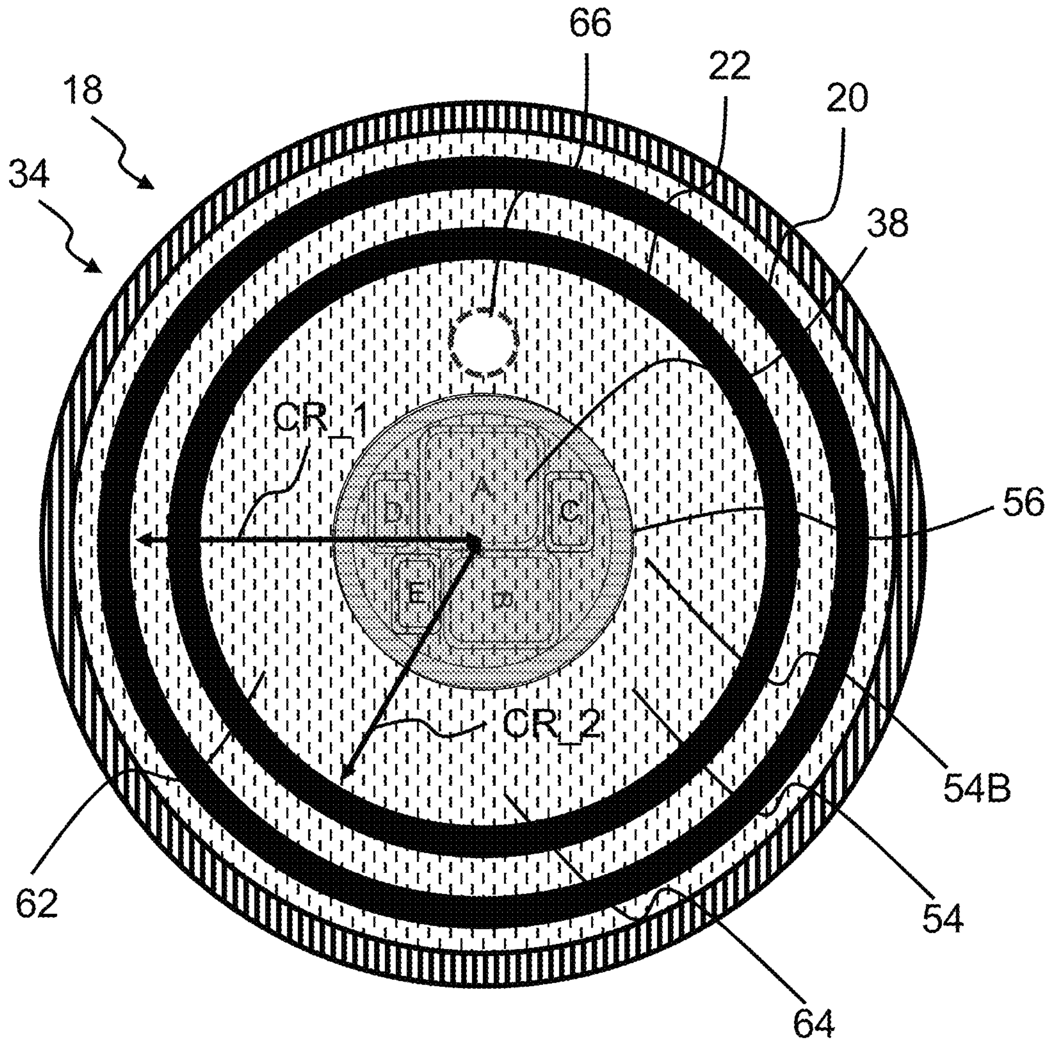
FIG. 5 is a top view of an example adapter of a battery unit.

FIG. 5 shows a top view of a battery unit with adapter of FIG. 4. The adapter 34 comprises a printed circuit board assembly 64 comprising printed circuit board 54, electronic circuitry 38 mounted on the PCB 54 and a cover 56 covering the electronic circuitry 38.

The electronic circuitry 38 comprises one or more electronic components including a protector A, a memory in the form of an EEPROM B, a diode C, a resistor D, and a capacitor E.

The PCBA 64 comprises the first contact 20 formed as a metallic ring on outer surface 54B of PCB 54 and having a first contact radius CR_1 and arranged on the intermediate outer surface 62 of the adapter. The first contact 20 is a data connection and is connected to the EEPROM via one or more conductors in the PCB 54. In other words, the hearing device can read data, such as one or more battery identifiers, stored on the EEPROM via the first contact 20.

The PCBA 64 comprises the second contact 22 formed as a metallic ring on the outer surface 54B of the PCB 54 and having a second contact radius CR_2 less than CR_1 and arranged on the intermediate outer surface 62 of the adapter. The second contact 22 is a negative contact or ground connected to ground of the electronic circuitry. Further, the second contact 22 is connected to a first electrode of the battery e.g. via one or more conductors in the PCB and a first inner contact 68 on inner surface 54A of the PCB 54 opposite outer surface 54B as shown in FIG. 4. Thus, the second contact 22 is electrically connected to a first electrode of the battery and the electronic circuitry 38.

Optionally, the PCBA comprises a test pad 66 on the outer surface 54B of the PCB 54

Figure 6:
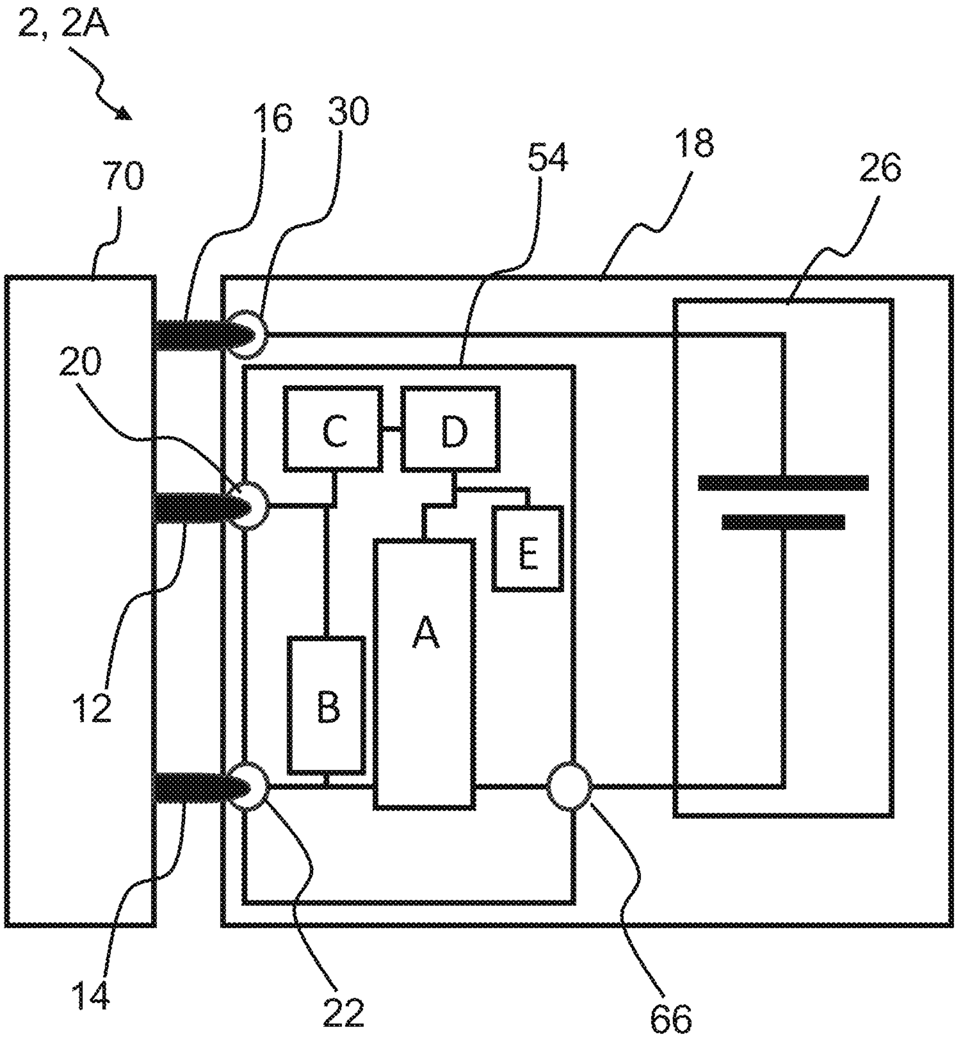
FIG. 6 shows parts of a circuit diagram of a hearing device with a battery unit in the battery compartment, FIG. 7 schematically illustrates a cross section of an example hearing device, FIG. 8 schematically illustrates an example adapter of a battery unit, and FIG. 9 schematically illustrates a cross section of an adapter.

FIG. 6 shows parts of a circuit diagram of a hearing device with a battery unit in the battery compartment. The hearing device PCBA 70 is connected to the battery unit 18 via battery terminals 12, 14, 16 and contacts 20, 22, 24. The electronic circuitry is mounted on PCB 54 and comprises protector A and EEPROM B. In other words, the electronic circuitry comprises protection and identification circuitry advantageously protecting the battery against over-charge and/or discharge.

Figure 7:
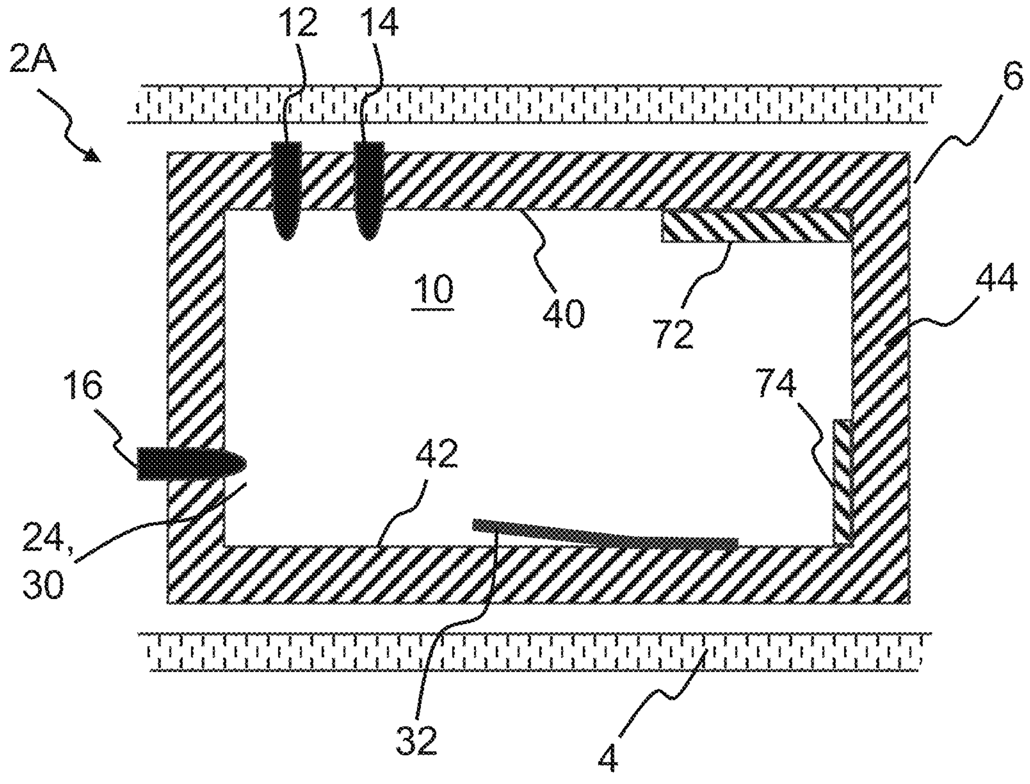

FIG. 7 shows a cross section of an example hearing device 2A without the battery unit. The battery compartment 10 of hearing device comprises a guide element 72 configured to prevent insertion of the battery unit 18 in the second orientation. The guide element 72 is formed as a protrusion in the first wall 40 and provides a recess for the cover of the battery unit and battery terminals 12, 14. The guide element ensures that the battery unit is prevented from being inserted in the second rotation as illustrated in FIG. 2. In one or more examples, a guide element protrudes from the third wall 44 e.g. as illustrated by optionaly guide element 74. The guide elements 72, 74 may be integrated in one or more of the walls 40, 42, 44.

Figure 8:
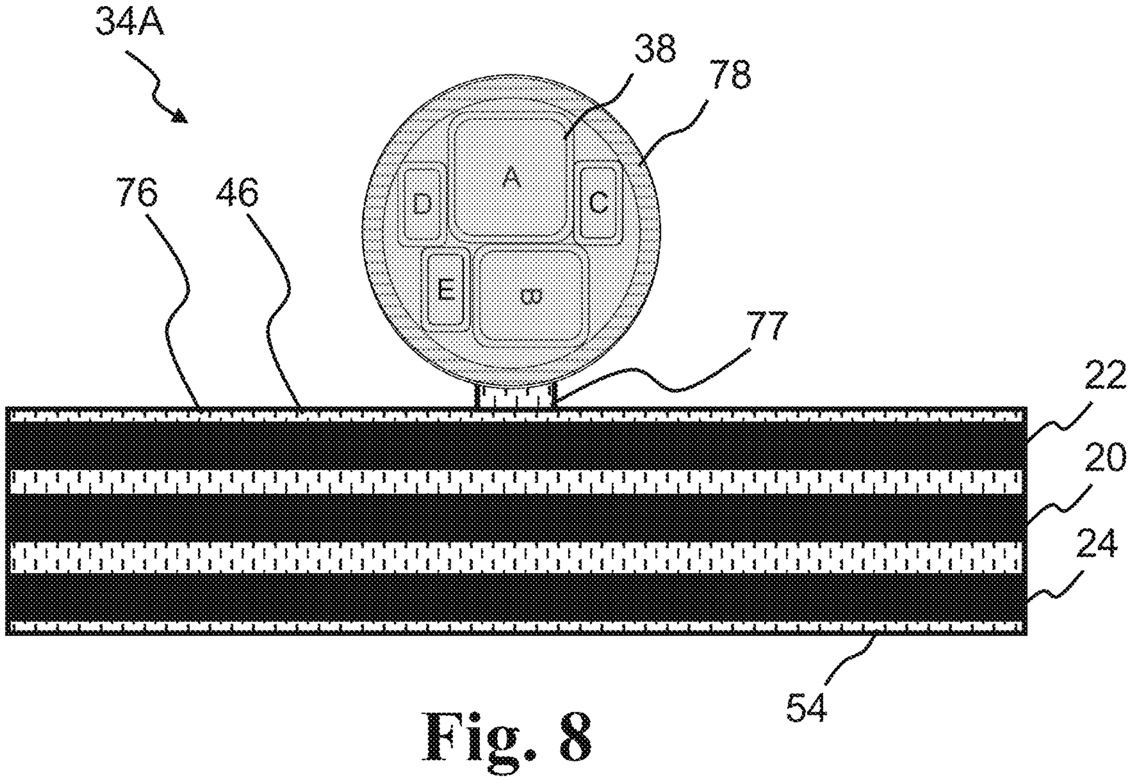
Figure 9:
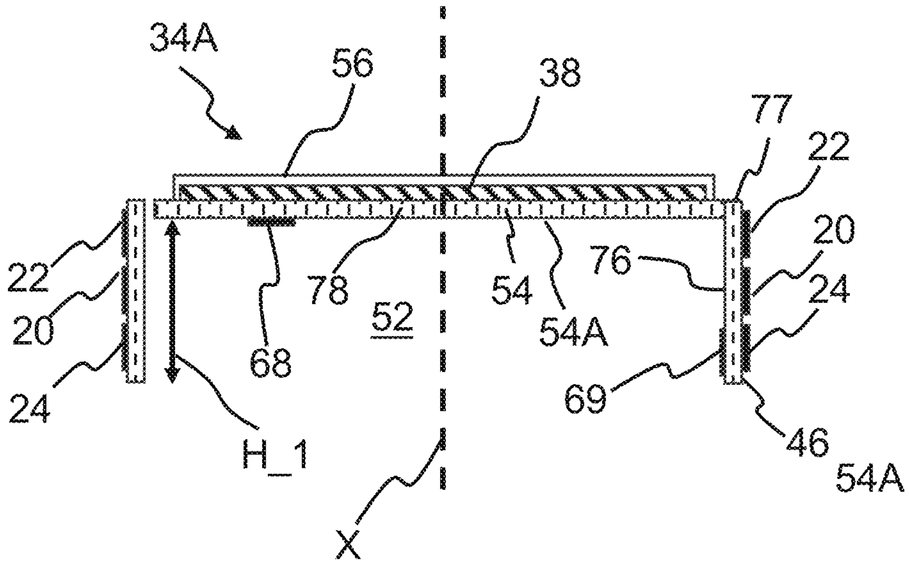

FIG. 8 and FIG. 9 show an example adapter 34A for a hearing device with three battery terminals arranged in the third wall. The contacts 20, 22, 24 of flex-PCB 54 forming the body are arranged on outer surface 54B of side part 76 the PCB 54, the side part 76 being formed to a cylinder forming the first side wall 46 of the adapter 34A. The PCB comprises a bending part 77 that is folded or bent such that the top part 78 of the PCB 54 with the electronic circuit 38 and cover 56 is folded to contact first electrode of the battery (not shown) via first inner contact 68 on inner surface 54A, the first inner contact electrically connected to the second contact 22 and electronic circuit 38 via conductors in PCB 54. The adapter 34A comprises a second inner contact 69 on the inner surface 54A of PCB, the second inner contact 69 electrically connected to second electrode of the battery and to the third contact 24 via conductor in PCB 54. Thus, the third contact 24 is electrically connected to a second electrode of the battery. The contacts 20, 22, 24 form metallic ring elements on the first outer side surface of the adapter 34A. The adapter may be glued to the battery.

The contacts 20, 22, 24 are arranged on the outer surface 54B such that at least one of the contacts 20, 22, 24, when the battery unit with adapter 34A has a second orientation, does not contact a battery terminal in the battery compartment of the hearing device.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that the figures comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

2, 2A hearing device
4 housing
6 frame
10 battery compartment
12 first battery terminal
14 second battery terminal
16 third battery terminal
18 battery unit
20 first contact
22 second contact
24 third contact
26 battery
28 first electrode of battery
30 second electrode of battery
32 spring element
34, 34A adapter
36 body
38 electronic circuitry
40 first wall
42 second wall
44 third wall
46 first side wall
48 first outer side surface
50 first inner surface
52 battery cavity
54 printed circuit board, PCB
54A inner surface of PCB
54B outer surface of PCB
56 cover
58 second side wall
60 second outer side surface
61 top wall
62 intermediate outer surface
64 printed circuit board assembly, PCBA
66 test pad
68 first inner contact
69 second inner contact
70 hearing device PCBA
72 guide element
74 guide element

The invention claimed is:

1. A battery unit for a hearing device, the battery unit having a main axis and comprising an adapter and a battery, wherein the battery is at least partly accommodated in a battery cavity of the adapter, the adapter comprising:
a body;
a first contact configured to contact a first battery terminal of the hearing device; and
electronic circuitry connected to the first contact and comprising a memory connected to the first contact, wherein the battery unit has an outer configuration configured to allow the battery unit to fit in a battery compartment of the hearing device such that the adapter is in the battery compartment and is properly connected to the hearing device electrically when the battery unit is in a first orientation, and to prevent the adapter from properly connected to the hearing device electrically when the battery unit is in a second orientation opposite from the first orientation.

2. The battery unit according to claim 1, wherein the adapter has a first sidewall with a first outer side surface and a first diameter, and wherein the adapter has a second sidewall with a second outer side surface and a second diameter less than the first diameter.

3. The battery unit according to claim 2, wherein the first sidewall of the adapter has a first inner surface forming a part of the battery cavity, and wherein the first sidewall has a first height less than a height of the battery.

4. The battery unit according to claim 1, wherein the first contact comprises a metallic ring having a first contact radius, and wherein the metallic ring is on an outer surface of the adapter.

5. The battery unit according to claim 1, the adapter comprising a second contact configured to contact a second battery terminal of the hearing device, wherein the second contact is electrically connected to a first electrode of the battery.

6. The battery unit according to claim 5, wherein the second contact is connected to the electronic circuitry.

7. The battery unit according to claim 6, wherein the first contact comprises a first metallic ring having a first contact radius; and wherein the second contact comprises a second metallic ring having a second contact radius, wherein the second metallic ring is on an outer surface of the adapter.

8. The battery unit according to claim 7, wherein the second contact radius is smaller than the first contact radius.

9. The battery unit according to claim 5, wherein the adapter comprises a third contact configured to contact a third battery terminal of the hearing device, wherein the third contact is electrically connected to a second electrode of the battery.

10. The battery unit according to claim 1, wherein the adapter comprises a printed circuit board assembly, the printed circuit board assembly comprising a printed circuit board, the electronic circuitry, the first contact, and a cover.

11. The battery unit according to claim 10, wherein the adapter has a first sidewall with a first outer side surface, and wherein the adapter has a second sidewall with a second outer side surface; and wherein the cover forms the second sidewall and a top wall of the adapter.

12. The battery unit according to claim 10, wherein the printed circuit board assembly comprises a test pad.

13. The battery unit according to claim 1, wherein the battery unit is completely insertable into the battery compartment when the battery unit is in the second orientation.

14. The battery unit according to claim 1, wherein the battery unit is not completely insertable into the battery compartment when the battery unit is in the second orientation.

15. A hearing device comprising:

a housing forming at least a part of an outer surface of the hearing device;

a frame in the housing; and a battery compartment comprising a first battery terminal, a second battery terminal, and a third battery terminal configured to contact respective contacts of a battery unit, when the battery unit is in a first orientation;

wherein at least one of the first battery terminal, the second battery terminal, or the third battery terminal is configured to not contact one of the contacts of the battery unit, when the battery unit is in a second orientation opposite from the first orientation.

16. The hearing device according to claim 15, wherein the battery compartment comprises a guide element configured to prevent insertion of the battery unit in the second orientation.

17. The hearing device according to claim 16, wherein the guide element comprises a protrusion extending from an inner surface of the battery compartment.

18. The hearing device according to claim 15, wherein the battery compartment comprises a spring element configured to press the battery unit towards the first battery terminal.

19. The hearing device according to claim 15, further comprising the battery unit.

20. The hearing device according to claim 19, wherein the battery unit comprises:

an adapter; and a battery; wherein the battery is at least partly accommodated in a battery cavity of the adapter.

21. The hearing device according to claim 20, wherein the adapter comprises a body, a first contact of the contacts of the battery unit, and electronic circuitry connected to the first contact, wherein the electronic circuitry comprises a memory connected to the first contact.

22. The hearing device according to claim 21, wherein the battery unit has an outer configuration configured to allow the battery unit to fit in the battery compartment of the hearing device when the battery unit is in the first orientation, and to prevent the battery unit from fitting in the battery compartment of the hearing device when the battery unit is in the second orientation opposite from the first orientation.

23. The hearing device according to claim 15, wherein the battery unit comprises a battery.

24. The hearing device according to claim 15, wherein the battery unit comprises an adapter configured for placement inside the battery compartment.

* * * * *